Nov. 2, 1965   J. G. FONTAINE   3,215,791
AUTOMATIC WEEKLY CYCLE TELEVISION PROGRAMMER
Filed March 11, 1963   8 Sheets-Sheet 1
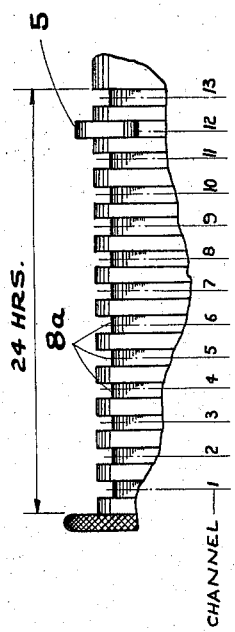
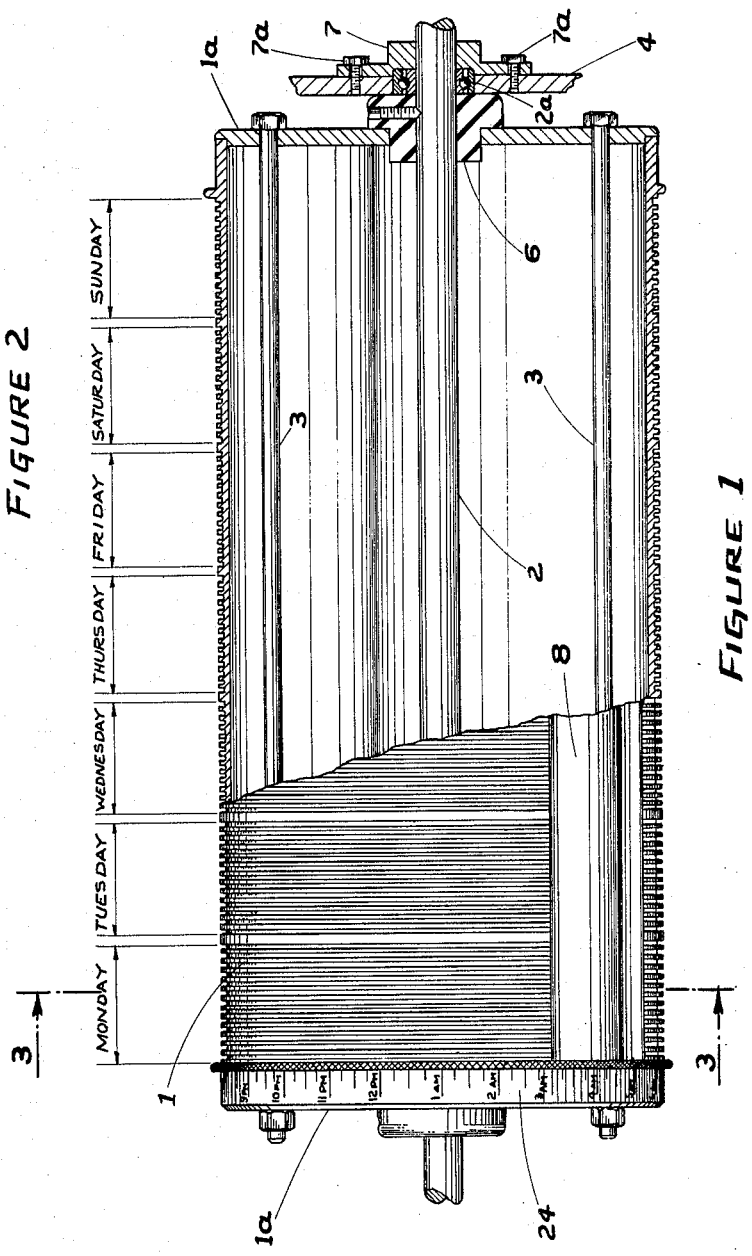
INVENTOR.
JOHN GARFIELD FONTAINE
BY ATTORNEY Nov. 2, 1965          J. G. FONTAINE          3,215,791

AUTOMATIC WEEKLY CYCLE TELEVISION PROGRAMMER

Filed March 11, 1963          8 Sheets—Sheet 2

INVENTOR.
JOHN GARFIELD FONTAINE
BY ATTORNEY

Nov. 2, 1965  J. G. FONTAINE  3,215,791
AUTOMATIC WEEKLY CYCLE TELEVISION PROGRAMMER
Filed March 11, 1963  8 Sheets-Sheet 3

INVENTOR.
JOHN GARFIELD FONTAINE
BY ATTORNEY

Nov. 2, 1965    J. G. FONTAINE    3,215,791
AUTOMATIC WEEKLY CYCLE TELEVISION PROGRAMMER
Filed March 11, 1963    8 Sheets-Sheet 4

INVENTOR.
JOHN GARFIELD FONTAINE
BY ATTORNEY

Nov. 2, 1965    J. G. FONTAINE    3,215,791
AUTOMATIC WEEKLY CYCLE TELEVISION PROGRAMMER
Filed March 11, 1963    8 Sheets-Sheet 5
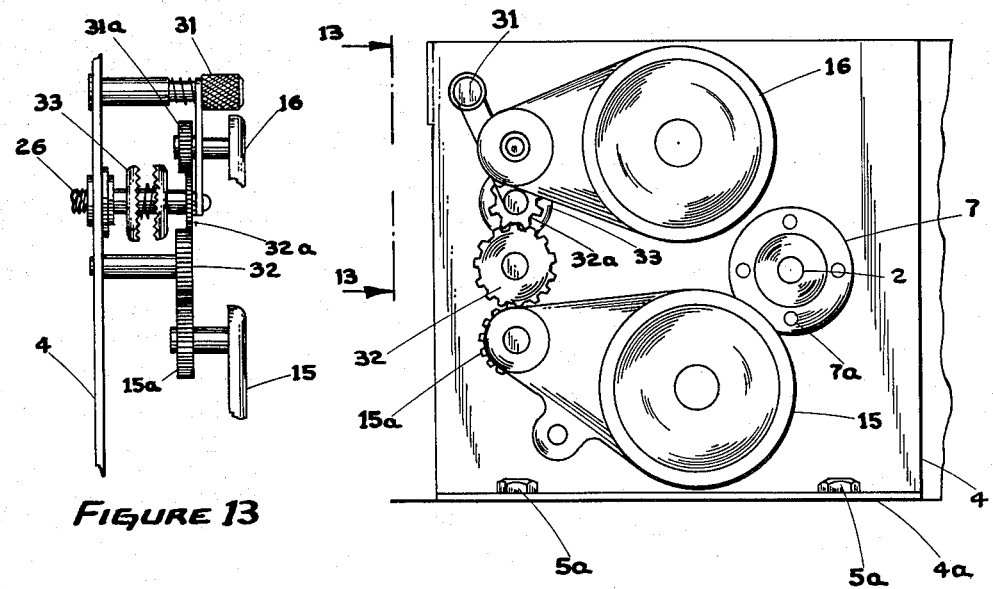
FIGURE 13
FIGURE 8
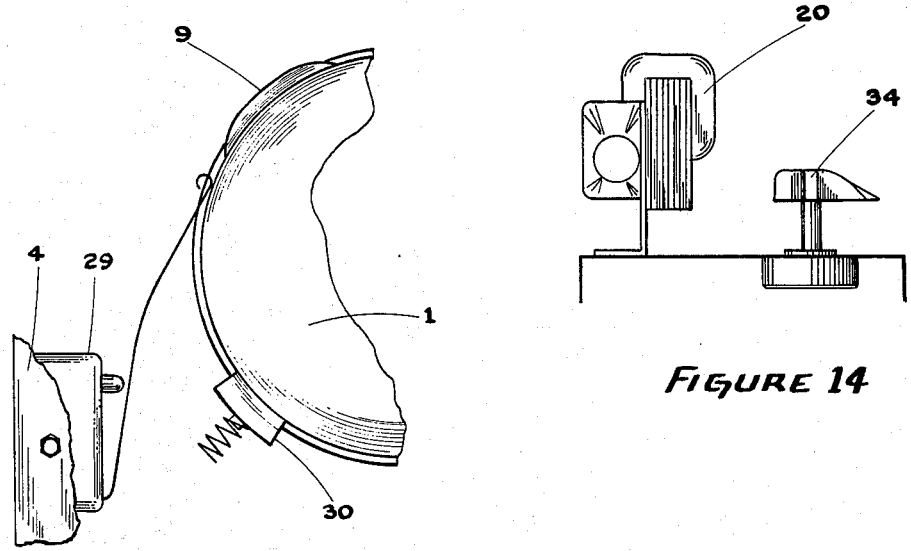
FIGURE 14
FIGURE 7
INVENTOR.
JOHN GARFIELD FONTAINE
BY ATTORNEY

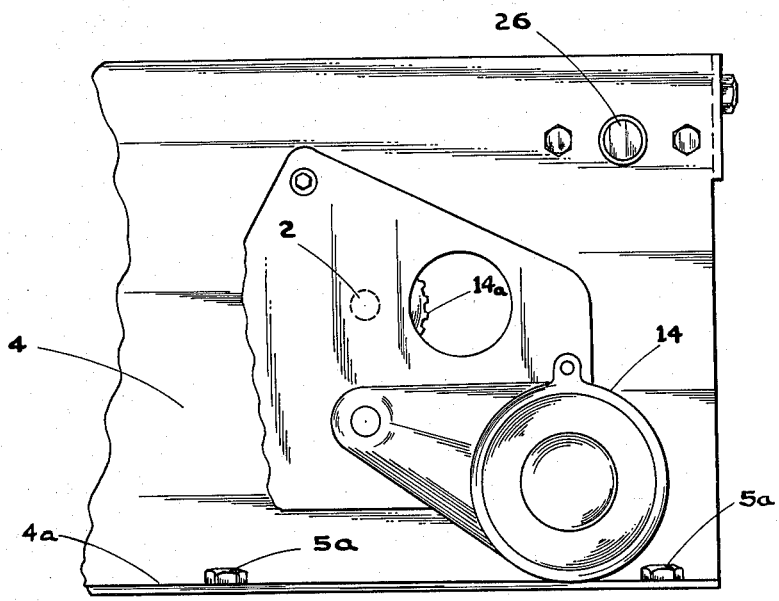
FIGURE 9
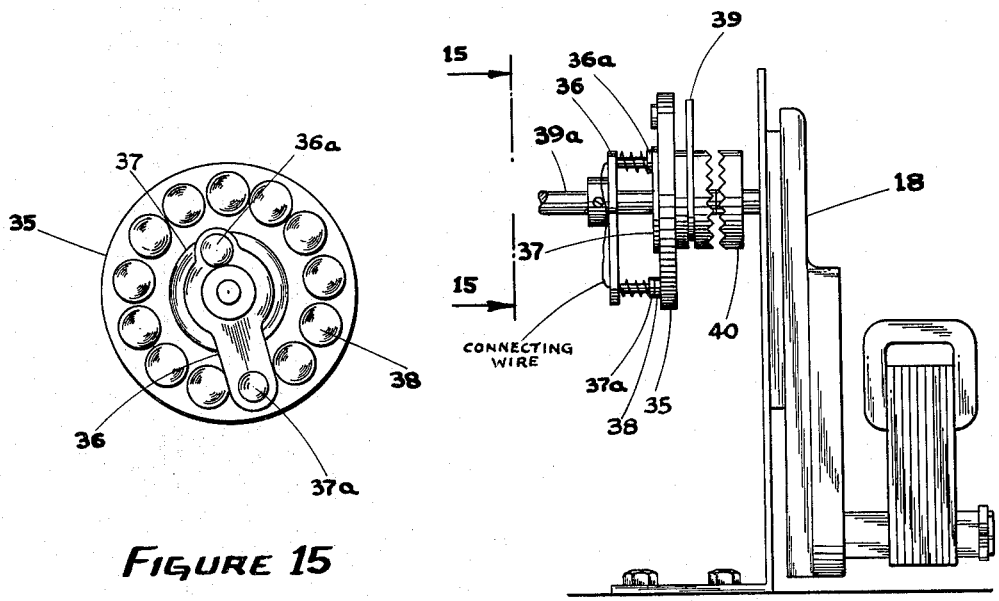
FIGURE 15
FIGURE 12

Nov. 2, 1965  J. G. FONTAINE  3,215,791
AUTOMATIC WEEKLY CYCLE TELEVISION PROGRAMMER
Filed March 11, 1963  8 Sheets-Sheet 7

INVENTOR.
JOHN GARFIELD FONTAINE
BY ATTORNEY

INVENTOR.
JOHN GARFIELD FONTAINE
BY
ATTORNEY

United States Patent Office 3,215,791
Patented Nov. 2, 1965

3,215,791
AUTOMATIC WEEKLY CYCLE TELEVISION
PROGRAMMER
John G. Fontaine, 2817 NE. 26th Court,
Fort Lauderdale, Fla.
Filed Mar. 11, 1963, Ser. No. 264,226
7 Claims. (Cl. 200—38)

This invention relates to television apparatus, and more particularly to means for controlling the operation of a television receiving set so that the same will be automatically turned on or off at desired times and will be tuned to the required channels selected for reception.

It is an object of the invention to provide a device of this character by which the user of a television set can preselect one or more programs which he desires to watch and at the selected time of day or night the device will automatically switch the set on and tune it to the channel at which the desired program originates. With a device constructed as herein described, it is possible to program the set for the duration of seven days and repeat the selected programs indefinitely.

It is an object of the invention to provide means by which a television set user may arrange the device so that it will tune in certain channels at specified times; for example, on Wednesday at 8 p.m. a program on Channel 4 is desired and on Thursday at 9:30 p.m. a program on Channel 2 is wanted. Thus, on Wednesday at 8 p.m. Channel 4 will be automatically tuned in and at 9 p.m. at the conclusion of the performance on Channel 4, the set will tune in Channel 2 if Channel 2 is next desired, or will tune in any other channel that has been selected for that time, or if no program has been selected the set will be switched off. On Thursday evening at 9:30 p.m. the set will be automatically switched on and tuned to the channel selected for that time, such as Channel 2 as above mentioned. At the conclusion of the program on that channel the set will be tuned off unless a following program on that channel or on another channel at that time, has been selected.

The invention allows for the pre-programming of any show on any of the present-day thirteen channels during any time of the day or week. The invention, however, is not limited in its use to the present-day arrangement of thirteen channels, but could be constructed for use for any number of channels. Once the programs have been selected and the device set accordingly, the operation of the television set will be automatic, the set being switched on or off at the required times and switched automatically to the programs selected. By the use of this device it is possible for the set user to never miss any programs of interest to him. User is not, however, limited in his viewing to the pre-arrangement of channels selected by the automatic timing device, but can change the set to manual operation and select any other desired channel.

With these and other objects to be hereinafter set forth in view, I have devised the arrangement of parts to be described, and more particularly pointed out in the claims appended hereto.

In the accompanying drawings, wherein an illustrative embodiment of the invention is shown, FIG. 1 is a view of the selector drum, shown partially in section;

FIG. 2 shows a portion of the drum with parts of the grooves thereon as used for a day's programs;

FIG. 7 is a sectional view, taken substantially on the line 7—7 of FIG. 5, looking in the direction of the arrows;

FIG. 8 is a view taken along the line 8—8 of FIG. 5, looking in the direction of the arrows;

FIG. 9 is a view taken along the line 9—9 of FIG. 5, looking in the direction of the arrows;

FIG. 12 is a view taken along the line 12—12 of FIG. 5, looking in the direction of the arrows;

FIG. 13 shows the driving gearing and clutch mechanism for the lead screw, along line 13—13 of FIG. 8, looking in the direction of the arrows;

FIG. 14 is a view taken along the line 14—14 of FIG. 5, looking in the direction of the arrows;

FIG. 15 is a view taken along the line 15—15 of FIG. 12, looking in the direction of the arrows;

Figure 16A:
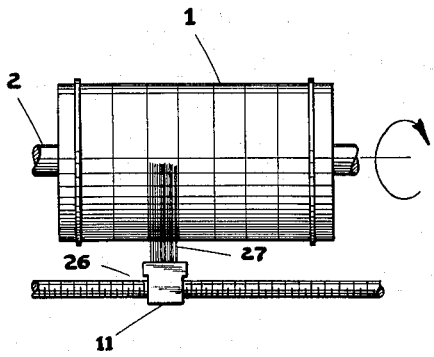
Figure 16B:
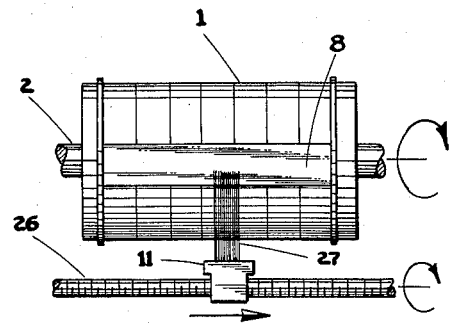
Figure 16C:
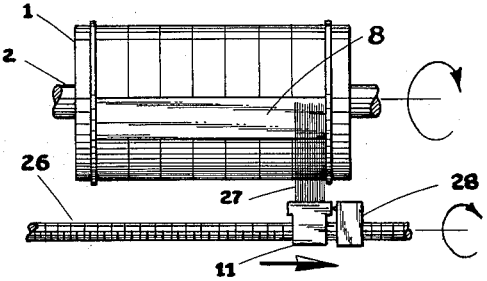
Figure 16D:
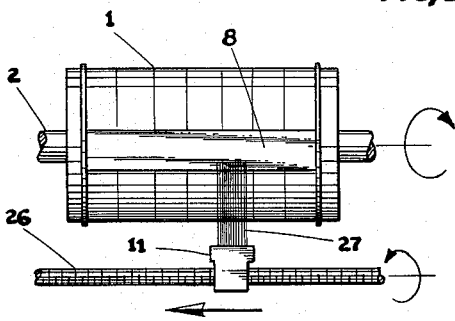
Figure 16E:
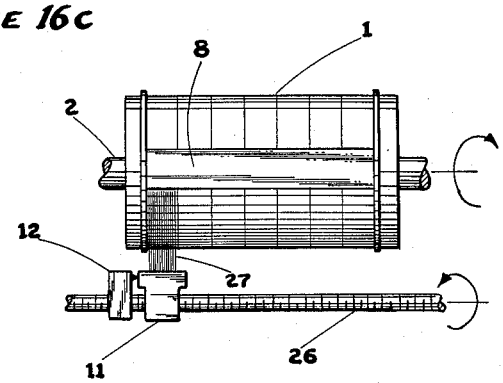
Figure 17:
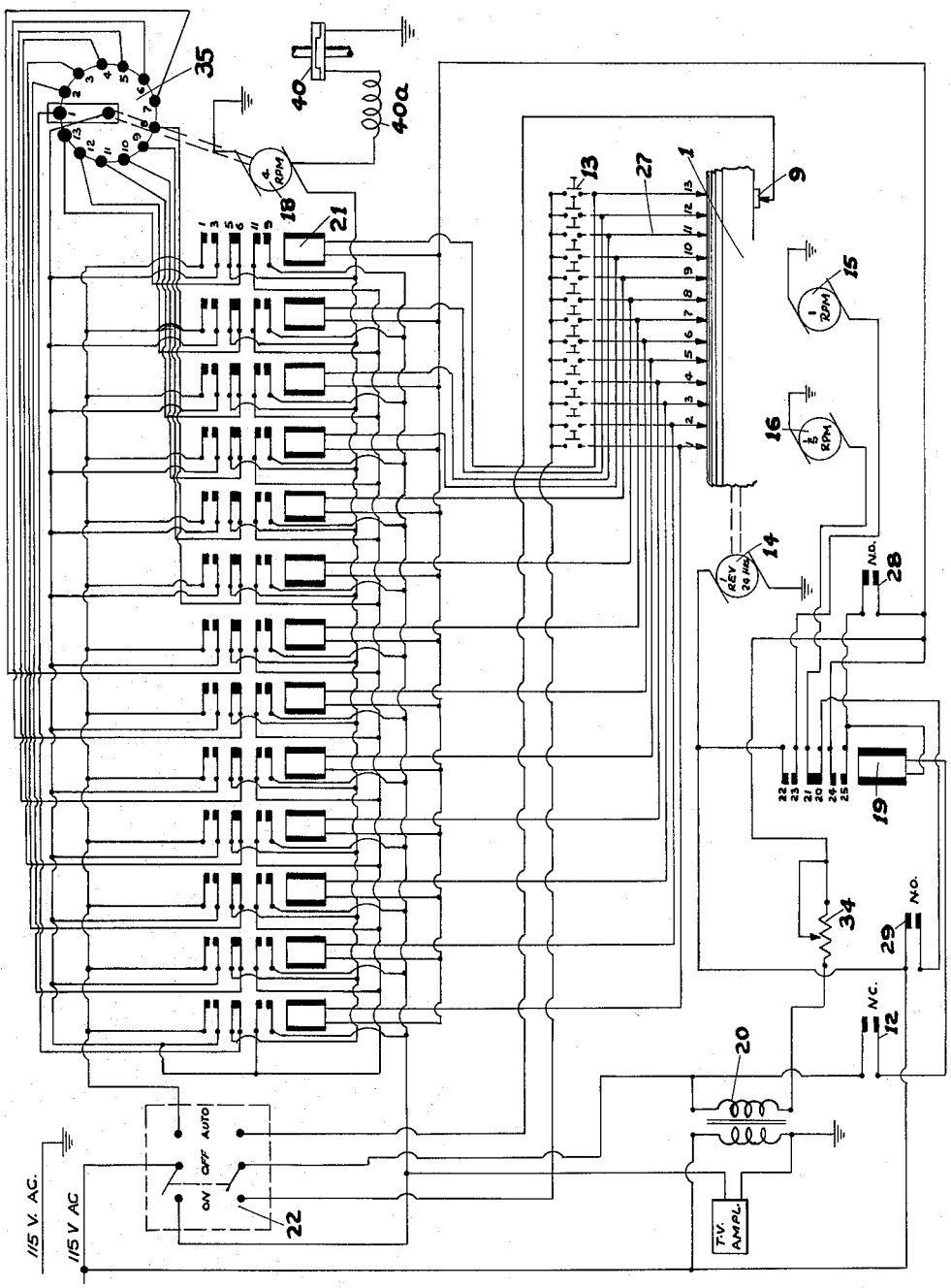

FIGS. 16A to 16E inclusive are views illustrating the operation of the contact fingers and drum, and FIG. 17 shows the electrical circuit.

The device includes a coated drum 1 of twenty-four inch circumference. The drum is of hollow construction and is borne by a rotatable, central shaft 2, mounted in bearings 2a in two spaced-apart brackets 4 having feet 4a secured by bolts 5a to the wall 6a which may form a part of the housing or cabinet of the television set. At each end of the shaft 2 there is provided an insulating plug 6, thereby electrically insulating the shaft 2 from the brackets 4. A sealing plate 7, secured to the bracket 4 by screws 7a, mounts the bearings 2a in the brackets 4. The drum 1 is closed at its opposite ends by disks 1a connected to the tie rods 3.

The circumference of the drum is laterally subdivided into seven parts or sections of equal width, each of said sections is divided to form thirteen circular grooves 8a of equal width representing the thirteen presently-used television channels. These grooves 8a (FIG. 2) extend circumferentially around the periphery of the drum. This pattern is interrupted or broken up only by a blank segment 8 which extends for the entire length of the drum.

At each end of the drum, space is provided for a scale 24 representing the twenty-four hours of the day. Since the total circumference of the drum is twenty-four inches, every inch on its circumference represents an hour and any fraction thereof represents any corresponding fraction of an hour.

The blank section 8 of the drum is so located that it corresponds with the hours of 3 a.m. to 5:30 a.m., respectively. The drum 1 rotates in a clockwise direction, when viewed from the right of FIG. 1 and has a speed of one revolution per day, and it is rotated by means of a synchronous motor shown at 14. The motor 14 and the shaft 2 are connected by a gear and clutch arrangement, the gearing being generally indicated at 14a and the clutch at 15a.

At one end of the drum 1 is provided a cam 9, which cam is operative to activate a microswitch 29 mounted on one of the brackets 4.

Adjacent to the drum 1, and mounted on the chassis of the set, is a scale 17 indicating the days as well as the television channels for each day. The scale extends for the full length of the drum. Contact with the drum is made by means of a brush-type contact 30 (FIG. 7) located at the lower right portion of the drum. Parallel to the drum 1 and extending for the entire length of the same, is a lead screw 26, which, with a pair of parallel guide rods 10, is mounted in the brackets 4. The lead screw and the guide rods 10 carry a sled 11 movable along the length of the screw and guide rods, and said sled carries thirteen insulated contact fingers 27. The fingers 27 are located so that they extend perpendicularly to the surface of the drum 1 and are so arranged that contact is made with the drum whenever one of the magnetic contact rings, shown at 5, inserted in one or the other of the grooves 8a of the drum, comes into contact with one of the insulated fingers 27.

The fingers 27 are caused to be moved longitudinally of the drum 1 by means of the lead screw 26. When the finger-bearing sled 11 reaches the right end of the drum 1, it contacts a microswitch 28 which activates a circuit that reverses the direction of rotation of the lead screw 26, which reversal of movement of said lead screw will move the sled 11 toward the left. This movement of the sled toward the left is interrupted by the contact of the sled with the microswitch shown at 12.

The lead screw 26 is connected to a gear arrangement as shown in FIG. 13 and can be powered by either one of the motors shown at 15 or 16. The engagement of the motors is dependent upon the movement desired. The lead screw 26 can also be uncoupled from either of the motors 15 or 16 by means of a clutch 33 operated manually by loosening the lever shaft 31. This arrangement is used for the purpose of allowing for a manual positioning of the fingers 27 in the longitudinal direction. As shown in FIG. 13, motor 15 drives a gear 15a, meshing with an idler gear 32 that engages with the clutch gear 32a, engaging gear 31a driven by the motor 16.

The mechanical parts of the programming device that are attached to the channel selector switch are as follows:

Connected to the selector shaft 39a is a rotating contact brush 36 having two contact points 36a and 37a mounted at spaced points on it. One of the contacts, or that shown at 36a, rides on a circular contact member 37 which is a part of a stationary disk 35. The second contact shown at 37a slides over a series of contact segments 38 (FIG. 15) located on the face of the disk 35. The function of these contact segments will be later described.

The disk 35 is free on the selector shaft 39a thus allowing the contact brush 36 to rotate relatively to the disk 35. The selector shaft 39a is connected to a reduction motor 18 by means of a magnetic clutch 40 which is activated by a coil 40a through the arm 39. The function of the clutch 40 is to detach the selector switch from the automatic means in order to allow for the manual selection of the channels.

In order to explain the operation of the apparatus, it is necessary to describe a complete operative cycle. The programming is done by placing one or more of the magnetized contact rings 5 in required positions in the selected grooves 8a in the drum 1.

Figure 3:
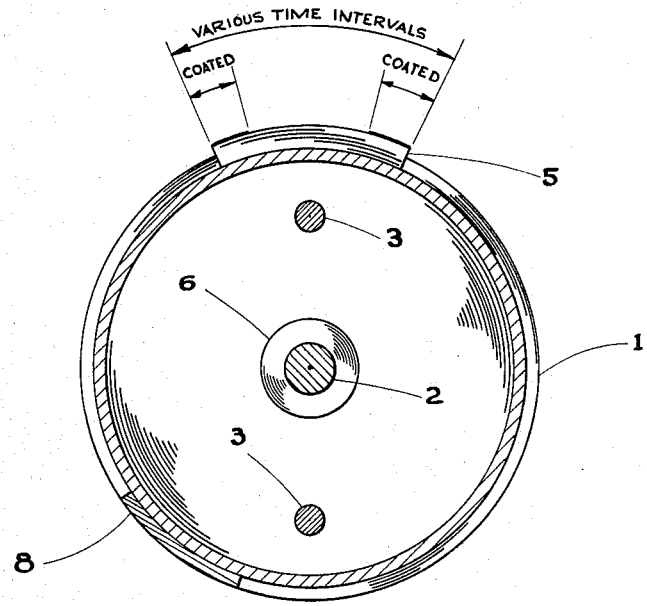
FIG. 3 is a sectional view, taken substantially on the line 3—3 of FIG. 1, looking in the direction of the arrows.
Figure 4:
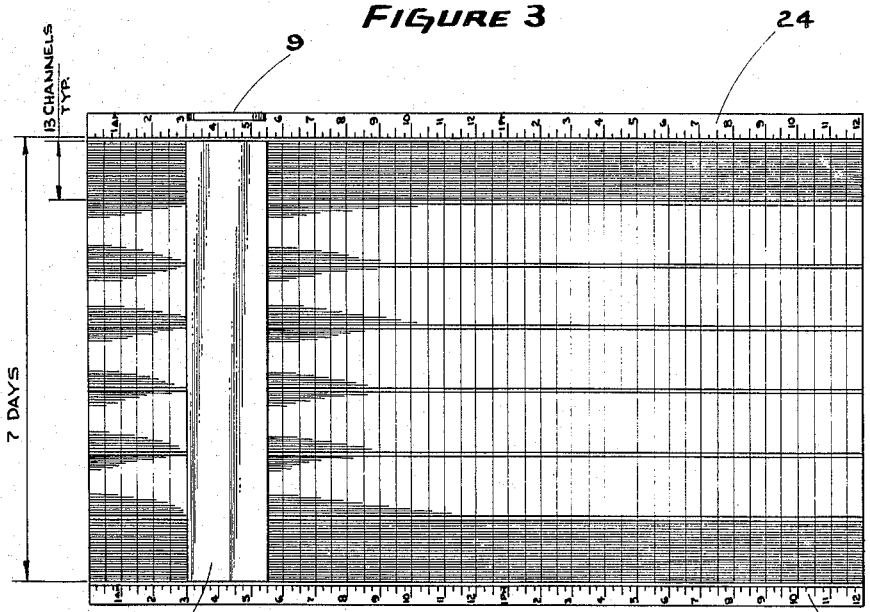
FIG. 4 is a view, in flattened form of the surface of the drum.
Figure 5:
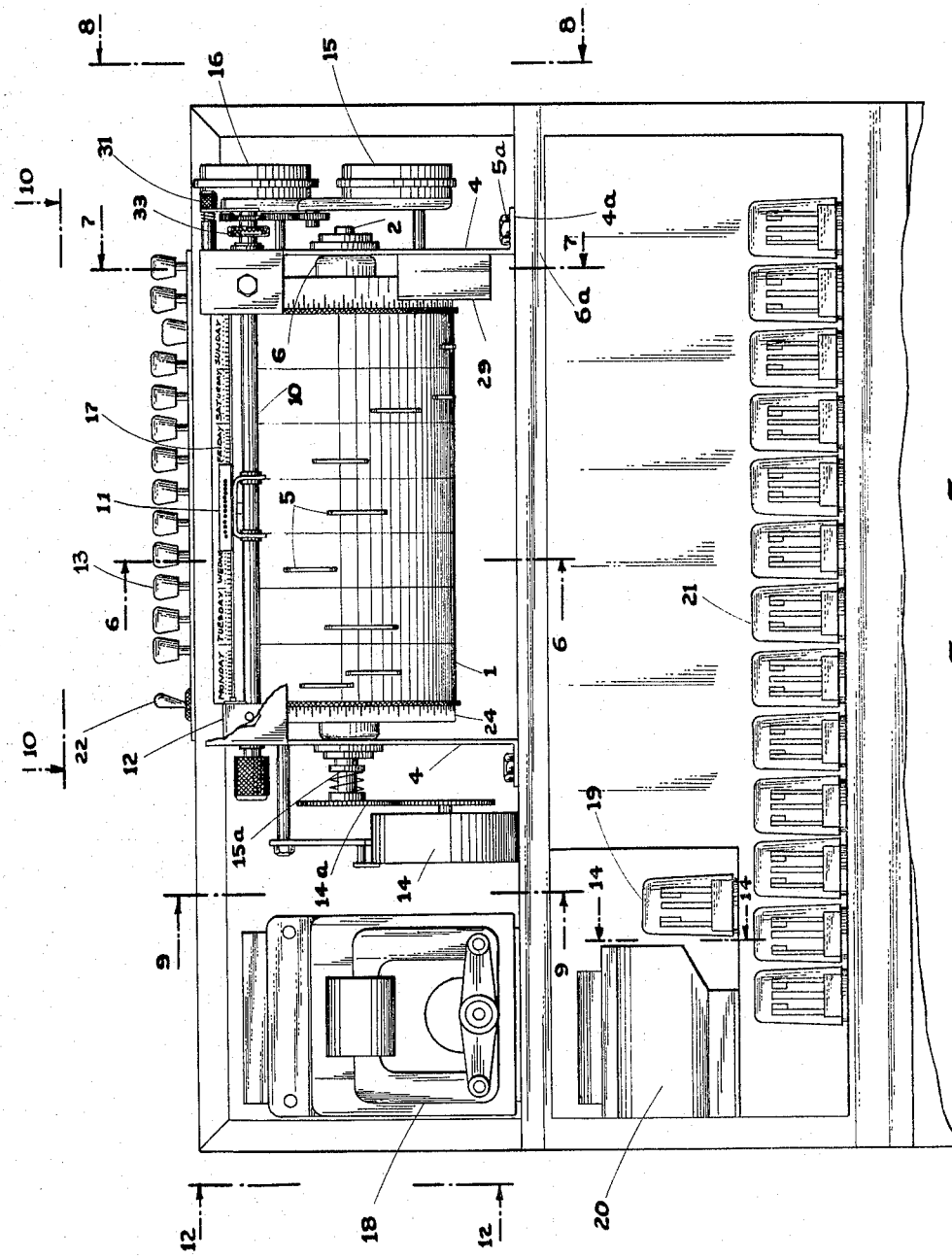
FIG. 5 is a plan view of the apparatus.
Figure 10:
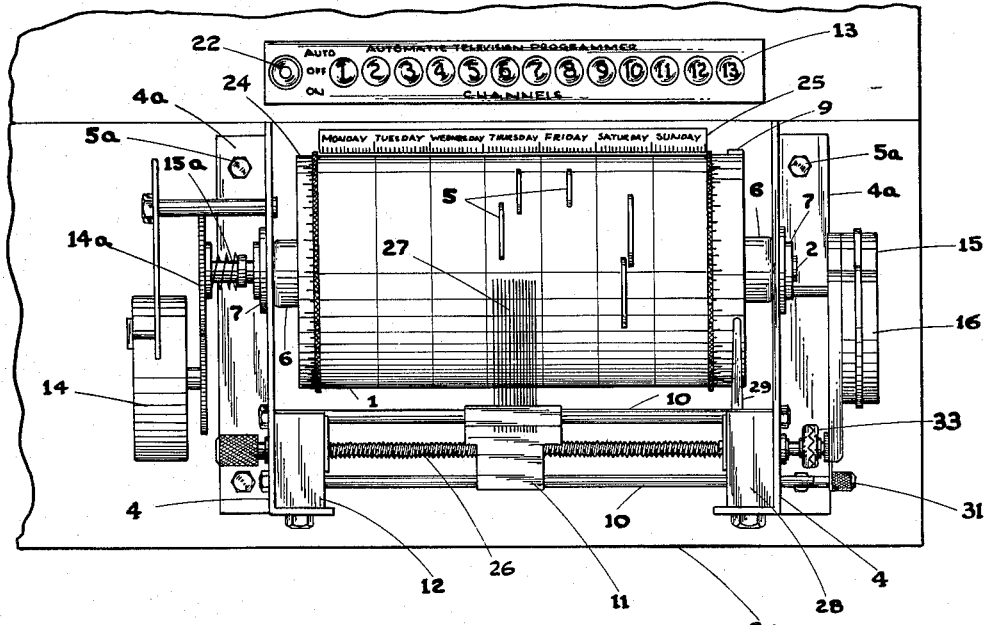
FIG. 10 is a view on the line 10—10 of FIG. 5, looking in the direction of the arrows.
Figures 6A, 11:
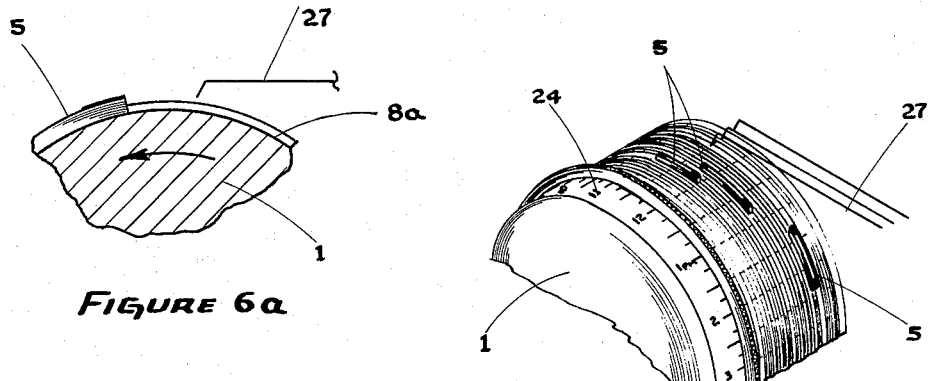
FIG. 6A shows a portion of the drum and a portion of one of the contact fingers operative on the same.
FIG. 11 is a perspective view of a portion of the drum.
Figure 6:
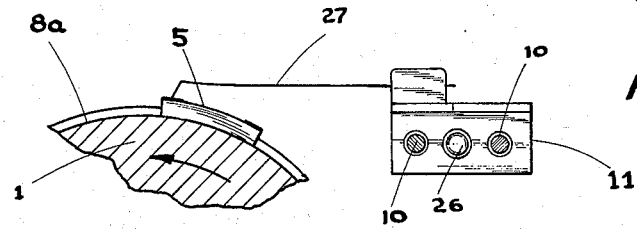
FIG. 6 is a sectional view, taken along the line 6—6 of FIG. 5, looking in the direction of the arrows.

For example, let it be assumed that it is 5:30 a.m. on a Monday morning with the parts in the position shown in FIG. 16E. The drum rotates clockwisely at a speed of one revolution a day and carries the contact rings 5 through a circular path. As the drum rotates, it passes the set of thirteen insulated fingers 27, the tips or outer extremities of which are located close to the surface of the drum substantially as shown in FIG. 6A. If one of the contact fingers passes over one of the contact rings 5, it will establish contact therewith as shown in FIG. 6, and the respective channel will be switched on. Contact will remain established as long as the contact ring 5 touches the finger 27. If any segment of the drum represents one hour, corresponding to an inch on the drum 1, the channel will remain switched on for that period.

If it be assumed that the contact ring 5 just described was so placed as to represent the hour extending from 3 to 4 p.m. on Channel 7 and that another ring 5 was so placed as to represent 4 to 4:30 p.m. on the same day on another channel, contact will then be switched at 4 p.m. from the first channel to the second channel by transference of contact by one of the fingers, representing the first channel to another finger representing the second channel and without interrupting the operation of the set. FIG. 11 shows such an arrangement. The contact procedure will be repeated as many times as contact rings 5 have been placed in the grooves 8a in the required positions.

As 3 a.m. on Tuesday morning is approached, the cam 9, carried at the right end of the drum 1 contacts with the microswitch 29. This closes the switch which controls the operation of the motor 16 and the motor causes turning of the lead screw 26 which causes the sled 11 and its thirteen fingers 27 to be moved over to the next day. The rotative speed of the motor 16 is such as to assure exact travel of the fingers in a direction longitudinally of the drum, which is a necessity for the exact positioning of the fingers for the cycle of the day. See FIG. 16B. This movement of the fingers longitudinally of the drum takes about two hours and ten minutes and is governed by the length of the cam 9 on the drum 1. Thus, the drum moves about 2½ inches radially while the fingers move longitudinally of it. The blank space 8 occupies about 2½ inches of the circumference of the drum and it extends for the entire length of the drum and insures no programming for 150 minutes during which time the ends of the fingers 27 are located over the space 8 as seen in FIGS. 16B, 16C and 16D.

The switching from one day to the next takes place every night of the seven days of the week until Monday morning at 3 a.m. is reached, with the parts then positioned as shown in FIG. 16C. At that time, namely, 3 a.m. on Monday morning, the switch procedure as above described is initiated by the cam 9 making contact with switch 29. As the finger-carrying sled 11 moves to the right, it contacts the microswitch 28 after about five minutes. By the contact of the sled with the microswitch, a relay indicated at 19 is activated. This relay activates motor 15 and deenergizes the motor 16 which results in a counter-clockwise movement of the lead screw 26 and causes the travel of the sled 11 and its fingers 27 to the left as indicated in FIG. 16D. By the energization of the relay 19 a holding circuit has been closed which keeps the motor 15 running even after the cam 9 is out of contact with the microswitch 29. This holding circuit is necessary because of the relative traveling time of the fingers 27 from Sunday to Monday with respect to the time used for the daily switch-over. The device is arranged to allow for a somewhat longer travel time during the weekly switch procedure, such as two hours and twenty minutes, in order to assure that cam 9 has gone out of contact with the microswitch 29, for if the travel times were equal, the possibilities are that the motor 16 would restart as soon as the holding circuit is broken by microswitch 12, thus causing misalignment of the sled 11.

At the left end of the drum the sled 11 makes contact with a microswitch 12 which de-energizes the relay 19 and the device is then ready to start its weekly cycle.

The channel-selecting procedure is started as soon as one of the contact rings 5 comes in contact with one of the fingers 27, or in the manual operation as soon as one of the push-buttons shown at 13 is depressed. As the contact is established, a circuit between the finger 27 and the selecting mechanism of FIG. 12 is closed by means of a relay 21. The selector mechanism is located on the shaft of the channel selector, said shaft being shown at 39a, with the parts connected thereto as heretofore described.

If for example, finger number 3 contacts one of the contact rings 5, this will cause relay number three (see electrical diagram of FIG. 17) and which is one of the relays in the group 21, to energize the motor 18 and at the same time de-energize segment number three on the plate 35. This allows the contact brush 36 to rotate only until the segment number three is reached, at which point the brush will come to a stop since the de-energized segment breaks the circuit. The segment 38 referred to above as segment number three is that which coincides with television Channel 3 and consequently Channel 3 will come on the air. This relay operation as well as the switching of the channels can be performed manually by the depression of any of the pushbuttons shown at 13.

By reference to the electrical diagram shown in FIG. 17, the electric circuit being employed in the apparatus will be understood. The circuit is activated by a master switch shown at 22 connected to a 115 volt A.C. line. The switch has three positions, namely, on, off and automatic. The relay coils of the automatic TV programmer operate on low voltage. Transformer 20 is used for this power supply. It is to be noted that certain parts of the programmer must operate continuously even though the TV set is not in use. For example, synchronous motor 14, which turns the drum 1, one revolution each 24 hours, must receive a continuous supply of current; likewise, motors 15 and 16 together with their relays and microswitches, etc. all as more fully shown in FIG. 17.

Moving the master switch to the "on" position activates the manual circuit of the device and the depression of any one of the thirteen buttons 13, located on the unit, causes the motor 18 to rotate, causing also the de-energization of the corresponding contact element or segment 38 and thus the selection of the desired channel. The switch operations are carried out by the relay 21 located between the pushbuttons 13 and the selector mechanism. Each button is connected to an individual relay of identical construction. The switch circuit is closed by closing the contact points nine to eleven on the relay. The de-energization of the contact segment is caused by breaking the normally closed points five to six on the relay. Shifting the master switch to "automatic" transfers the function of the pushbuttons 13 to the fingers 27 and just as the circuit is closed by depressing any one of the buttons 13 in the manual operation, so will the finger 27 close the circuit by making contact with one of the magnetized contact rings 5. Each of the fingers 27, representing one channel, is connected to one of the relays 21. When such finger 27 establishes contact with one of the rings 5 and the normally open contact points one to three are closed and the normally closed contact points five to six on the relay are opened the result is the effect described above.

The daily switch-over cycle is accomplished by closing the microswitch 29 which energizes the motor 16 through closed points 20 and 21 of relay 19. The switch operation at the end of each week is wired as follows: Microswitch 29 is closed while microswitch 28 is also closed due to the timing; this opens points 20 to 21 on the relay 19 de-energizing the motor 16. At the same time the points 22 to 23 of the relay are closed energizing the motor 15 as well as closing the holding circuit of the relay 19 by closing the points 24 to 25 on the same. As soon as the microswitch 12 is contacted all of the above circuits are broken except for the one activating motor 14 and the cycle is then ready to be repeated.

From the foregoing, it is apparent that a device has been disclosed by which either manual or automatic turning on and off, as well as channel selection for a television receiving set is possible. By depression of the push buttons 13 the required channel can be tuned in manually or by the placement of the contact rings in the selected positions in the channels 8a, the set will be automatically caused to be switched on or off and tuned to the desired channels at the required times and without attention by the set user.

Having thus described a single embodiment of my invention, it is obvious that the same is not to be restricted thereto, but is broad enough to cover all control devices coming within the scope of the annexed claims wherein a predetermined number of variables can be actuated in a predetermined manner for an indefinite period of time.

What I claim is:

1. In a control device for television receivers, a rotative drum, means for rotating the same at a speed of one revolution per day, the drum having its periphery provided with grooves to represent television channels, the grooves being divided into groups, each of said groups representing a day's broadcasting, contact members placed in each groove at selected positions therein, a group of contact fingers corresponding in number to the number of grooves in each group, said fingers being extended over the grooves for contact with the contact members during the rotative movement of the drum and means for effective movement of the fingers as a unit from one group of grooves to an adjacent group.

2. In a control device as provided for in claim 1 including an ungrooved segment of the surface of the drum across which the contact fingers are moved during the transferrence from one group of grooves to the adjacent group.

3. A control device for television sets comprising a rotative drum having a plurality of peripheral grooves, contact members adapted for placement in selected grooves and for positioning at selected locations in said grooves, a contact carrier having contact fingers corresponding in number to the number of television channels, means for moving said contact carrier the length of the drum, the fingers on the carrier being adapted to contact with the contact members located in the grooves, switch means closed at selected times by cooperation between the contact members and the fingers according to the location of the contact members in the grooves, a selector shaft and motor activated means coupled thereto for turning said shaft to tune in a selected channel according to the groove in which a contact member is contacted by any one of the fingers.

4. A control device for television sets comprising, a rotative drum having a plurality of peripheral grooves, the drum being divided into sections with grooves corresponding in number to channels employed for television broadcasting in each of said sections, contact members for placement in selected grooves and at selected positions in said grooves according to broadcasting time periods, a contact carrier having contact fingers corresponding in number to television channels, a rotative lead screw for moving said carrier for the length of the drum, the fingers projecting from the carrier over the periphery of the drum and adapted to ride on the contact members in the grooves during the rotation of the drum, switch means closed at selected times by cooperation between the contact members and the fingers and at the times controlled by the location of the contact members in the grooves, a channel-selector shaft, and motor-actuated means coupled thereto for turning said shaft to tune in a selected channel according to the groove in which a contact member is located and is contacted by one of the fingers.

5. In a control device for television receivers, a channel-selector shaft, a motor for rotatively moving said shaft at predetermined times and for predetermined distances to thereby tune a television set to selected channels, a grooved drum and means for slowly rotating the same, the drum being peripherally provided with a plurality of grooves and with an ungrooved area extending for the length of the drum, a plurality of arcuate contact pieces selectively placed and positioned in the grooves in the drum, a plurality of contact fingers, a slide by which the fingers are carried with their extremities overlying the periphery of the drum for contact with the contact pieces during the revolution of the drum, means for moving the slide longitudinally of the drum, switch means at the end of movement of the slide for causing the slide to be moved in a reverse direction when the fingers are in contact with the ungrooved part of the drum during a non-operating period of the television set and while the fingers are free of contact with any of the contact pieces on the drum.

6. In a control device for television receivers, a drum and means for slowly rotating the same at a speed of 1 revolution per day, the drum having a plurality of peripheral grooves, said grooves being interrupted by an ungrooved band extending for a portion only of the circumference of the drum and for the full length of the drum, the grooves being divided into groups, each of said groups containing a groove for each of the television broadcasting channels, and each group representing a day's broadcast, contact rings adapted to be fitted selectively in the grooves for the tuning in of selected channels at specific times during the day's broadcast, each of said contact rings being of a length to establish electrical contact for a period of time equal to that of a selected broadcast, a plurality of contact fingers extended over the periphery of the drum and adapted to contact with the contact members in the grooves, a channel-selector shaft and means for rotatively moving the same to a point where a selected channel represented by a contact member then contacted by a finger is tuned in, an electrical circuit between the drum and said shaft-moving means to actuate said shaft-moving means, and said circuit including means for electrically activating the television set at times when any of the contact fingers is in contact with one of the contact members.

7. A control device for television sets comprising, a rotatable shaft, a drum carried thereon, said drum being sub-divided into a plurality of sections of equal width forming grooves to represent television channels, a blank segment extending across the grooves for substantially the length of the drum, a slidable carrier and means for moving the same axially of the drum, said carrier bearing a plurality of insulated fingers corresponding in number to the number of prevalent television channels, magnetic contact members located in the several grooves of the drum for selective contact with the fingers during the rotative movement of the drum, switch means located at one end of the drum for causing the slide-moving means to reverse the direction of travel of the carrier axially of the drum when said carrier has reached the end of the drum to actuate the switch means thereat, means for uncoupling the slide-moving means from its source of actuation to permit of manual shift of the carrier relatively to the drum, and means for effecting the reverse movement of the carrier only when the fingers thereon are in contact with the blank segment of the drum.

References Cited by the Examiner

UNITED STATES PATENTS

| 2,130,164 | 9/38 | Verkins | 200—38 X |
| 2,463,290 | 3/49 | Lolli et al. | 200—38 X |
| 2,564,229 | 8/51 | Pitney | 200—46 |

KATHLEEN H. CLAFFY, *Primary Examiner.*

ROBERT K. SCHAEFER, BERNARD A. GILHEANY,
*Examiners.*